Dec. 18, 1945.　　　　A. BURROWS　　　　2,391,223
THREAD CUTTING TOOL
Filed April 11, 1944

Inventor:
Allen Burrows,
by J. H. McCready,
Attorney.

Patented Dec. 18, 1945

2,391,223

UNITED STATES PATENT OFFICE 2,391,223

THREAD CUTTING TOOL

Allen Burrows, Providence, R. I.

Application April 11, 1944, Serial No. 530,515

1 Claim. (Cl. 10—140)

In connection with the operation of overhauling and repairing the engines of motor vehicles, it is usually necessary to take down more or less of the tubing which forms part of the lubricating or hydraulic brake systems, or which may be used for other purposes. In replacing this tubing it is a common experience to find that the threads of some of the connectors or junction fixtures have become battered so that some of them will not thread into their sockets. Even a slight distortion of the threads of one of these devices can cause a great deal of trouble, particularly if the socket or hole into which it is to be threaded is in a location where access to it is difficult.

Moreover, in most fixtures of piping, tubing, or other apparatus designed to conduct liquids, the screw threaded parts have a "lead" or a slight taper, which facilitates the starting of the male thread, but this is not true in the connectors and similar fixtures used with brass and copper tubing. Consequently, a workman often is compelled to renew considerably more of the whole tubing equipment than would be necessary if he could restore the battered threads to a workable condition.

Usually in situations of this kind a regular tap or die actually is not needed, but some tool of this type is required which will "chase out the thread" and remove the burrs or small deformities so that the two parts can be threaded together. However, neither a regular tap nor die, nor any tool capable of performing this function, is available to repair mechanics, so far as I have been able to learn.

The present invention aims to devise a tool which will perform these operations on both the male and female members of a connector, but which can be manufactured considerably more economically than the regular taps and dies and which can also be used without a special tap wrench or die stock.

The nature of the invention will be readily understood from the following description when read in connection with the accompanying drawing, and the novel features will be particularly pointed out in the appended claim.

Figure 1:
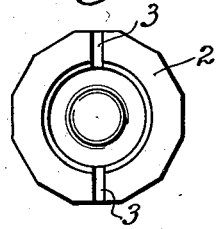
Fig. 1 is a plan view of a combined tap and die constructed in accordance with this invention.
Figure 2:
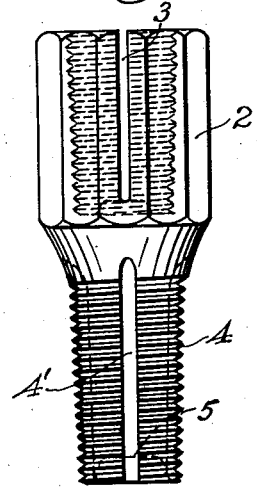
Fig. 2 is a side elevation of the tool shown in Fig. 1.
Figure 3:
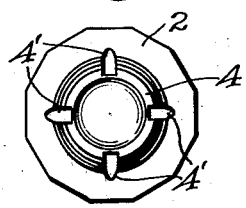
Fig. 3 is a bottom view of said tool.

Referring first to Figs. 1, 2 and 3, the implement there shown comprises a body including a tubular head 2 and a shank 4 in axial alignment with said head, the parts being here illustrated in twice their usual size. The head is internally screw-threaded and is slotted, as indicated at 3, so that where the slots cut the threads, edges will be formed which will, themselves, cut a thread on a suitably shaped piece of stock. The shank 4 is externally screw-threaded and is grooved, as illustrated at 4', to provide cutting edges which will enable it to act as a screw-threading tap. It also is counter-bored or recessed axially at its lower end, as indicated at 5. This device can be made in an automatic screw machine from suitable stock and then hardened.

Figure 4:
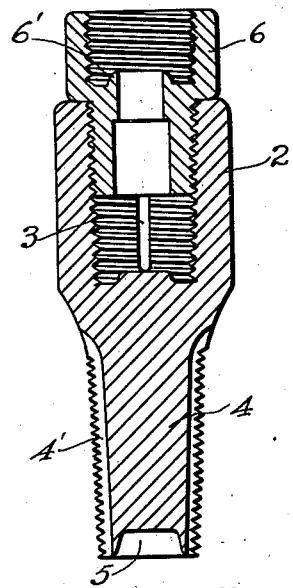
Figs. 4 and 5 are vertical, sectional views illustrating the manner in which the tool may be used.
Figure 5:
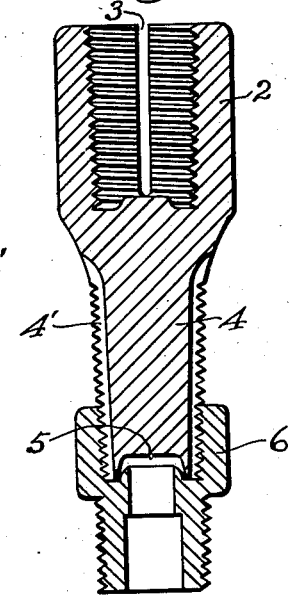

Figs. 4 and 5 show one way in which this combined tap and die can be used in repairing the threads of one member 6 of a typical connector for copper tubing. In Fig. 4 the die section is shown as threaded on to the shank of the connector unit 6 where it serves to clean up the thread of the latter, remove any upset or battered metal portions of the thread, and to smooth it out to such a degree that the device is perfectly useable. The thread may not be as good as it was originally but it will function satisfactorily.

In Fig. 5 the tap portion of the tool is shown as it is used in cleaning up the female thread in the upper end of a connector unit 6. In these connectors the female thread is not like the male thread, and the latter usually is somewhat larger in diameter than the former. Consequently, the die and tap sections differ correspondingly.

One advantage of this tool is that the lower end of the tap section is recessed to accommodate the nipple 6' in the head of the member 6 so that it can chase out the thread completely, as illustrated in Fig. 5, without interfering with the nipple. The latter is provided in these connectors to cooperate with the nut section (not shown) in clamping the belled-out or expanded end of the tube securely between these two parts. The regular taps are not made to accommodate this element of a connector and, consequently, the taps used with them must be made especially for these specific articles.

Figure 6:
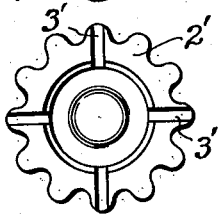
Fig. 6 is a top view of a modified form of tool body.

Preferably the head section 2 of the tool is shaped to fit into a wrench socket of some common form. If shaped, as shown in Fig. 6, it will fit into a twelve-point wrench socket so that this implement, which practically any mechanic has, can be used instead of the usual tap wrench or die stock in the event that it is necessary to use some such device in order to make this tool cut its thread; or in those situations where the tool must be used in a space so limited that it is impossible for a workman to manipulate it by hand. For most purposes the tool can be used merely by turning it between the thumb and fingers.

It will thus be seen that with two or three of these devices of different sizes a workman can save himself a great deal of time and trouble in assembling tube lines in which fittings of the type above described are used. The fact that each tool is a combined tap and die reduces the total number of parts that he is required to handle, and also effects an economy in manufacturing expense.

In Figs. 1 and 2 the die section of the tool is shown with only two slots, but in some sizes, at least, it will be preferable to make two more slots at right angles to those shown. Such a construction is illustrated in Fig. 6. The number of slots provided in either the head or shank will, however, be suited to the requirements of the particular article on which the device is to be used.

Having thus described my invention, what I desire to claim as new is:

A combined tap and die for repairing connectors for brass and copper tubing, comprising a metal body having a tubular head provided with an internal screw-thread slotted axially and thereby adapted to cut an external thread on the shank of one of said connector units, said head being shaped externally to fit into a socket wrench, said body also including a shank portion in axial alignment with, and positioned close to, said head, said shank being externally screw-threaded and grooved to form a tap adapted to fit the internal thread on said connector unit, the lower end of said shank being recessed axially to accommodate the nipple at the bottom of the socket in said connector unit.

ALLEN BURROWS.